US008611628B2

United States Patent
Hu et al.

(10) Patent No.: US 8,611,628 B2
(45) Date of Patent: Dec. 17, 2013

(54) USING NON-ATTENUATION CORRECTED PET EMISSION IMAGES TO COMPENSATE FOR INCOMPLETE ANATOMIC IMAGES

(75) Inventors: Zhiqiang Hu, Twinsburg, OH (US); Daniel Gagnon, Twinsburg, OH (US); Chi-Hua Tung, Aurora, OH (US)

(73) Assignee: Koninklijke Philips N.V., Eindhoven (NL)

( * ) Notice: Subject to any disclaimer, the term of this patent is extended or adjusted under 35 U.S.C. 154(b) by 234 days.

(21) Appl. No.: 12/990,285

(22) PCT Filed: May 4, 2009

(86) PCT No.: PCT/IB2009/051825
§ 371 (c)(1),
(2), (4) Date: Oct. 29, 2010

(87) PCT Pub. No.: WO2009/138898
PCT Pub. Date: Nov. 19, 2009

(65) Prior Publication Data
US 2011/0058722 A1    Mar. 10, 2011

Related U.S. Application Data

(60) Provisional application No. 61/053,401, filed on May 15, 2008.

(51) Int. Cl.
*G06K 9/00*    (2006.01)
(52) U.S. Cl.
USPC .................................................. 382/131
(58) Field of Classification Search
None
See application file for complete search history.

(56) References Cited

U.S. PATENT DOCUMENTS

| 5,608,221 | A | 3/1997 | Bertelsen et al. |
| 5,936,247 | A | 8/1999 | Lange et al. |
| 6,256,367 | B1 * | 7/2001 | Vartanian ........................ 378/7 |
| 6,490,476 | B1 * | 12/2002 | Townsend et al. ............ 600/427 |
| 6,539,103 | B1 | 3/2003 | Panin et al. |
| 6,631,284 | B2 * | 10/2003 | Nutt et al. .................... 600/427 |
| 6,740,883 | B1 * | 5/2004 | Stodilka et al. .......... 250/363.04 |
| 7,129,496 | B2 | 10/2006 | Stearns et al. |
| 7,312,455 | B2 * | 12/2007 | Manjeshwar et al. ... 250/363.03 |
| 7,507,968 | B2 * | 3/2009 | Wollenweber et al. .. 250/363.07 |

(Continued)

FOREIGN PATENT DOCUMENTS

JP    2005193018 A    7/2005

*Primary Examiner* — Nancy Bitar

(57) ABSTRACT

When compensating for truncated patient scan data acquired by a multi-modal PET/CT or PET/MR imaging system (14, 16), such as occurs when a patient is larger than a field of view for an anatomical imaging device, a segmented contour of a non-attenuation-corrected (NAC) PET image is used to identify a contour of the truncated region. An appropriate tissue type is used to fill in truncated regions of a truncated CT or MR image for the attenuation map. The corrected attenuation map is then used to generate an attenuation-corrected PET image of the patient or a region of interest. Alternatively, the system can be employed in PET/CT or PET/MR imaging scenarios where two modalities are performed sequentially (e.g., not simultaneously), and thus the contour derived from the PET scan can be compared to the CT or MR image to infer potential subject motion between the PET and CT or MR scans. Additionally, the system can be employed in PET imaging scenarios where the contour derived from the NAC PET image is used as emission boundary for scatter correction using single-scatter simulation, in which a tail-fitting procedure utilizes an emission boundary to define pure-scatter tails (e.g., in the absence of true coincidence events).

20 Claims, 3 Drawing Sheets

(56) References Cited

U.S. PATENT DOCUMENTS

| | | | |
|---|---|---|---|
| 7,813,783 B2* | 10/2010 | Thomas et al. | 600/407 |
| 8,017,914 B2* | 9/2011 | Wollenweber et al. | 250/363.04 |
| 8,155,415 B2* | 4/2012 | Faul et al. | 382/131 |
| 2003/0004405 A1 | 1/2003 | Townsend et al. | |
| 2004/0260176 A1* | 12/2004 | Wollenweber et al. | 600/427 |
| 2005/0129295 A1 | 6/2005 | Shanmugam et al. | |
| 2008/0107229 A1* | 5/2008 | Thomas et al. | 378/4 |

* cited by examiner

USING NON-ATTENUATION CORRECTED PET EMISSION IMAGES TO COMPENSATE FOR INCOMPLETE ANATOMIC IMAGES

CROSS REFERENCE TO RELATED APPLICATIONS

This application claims the benefit of U.S. provisional application Ser. No. 61/053,401 filed May 15, 2008, which is incorporated herein by reference.

The present application finds particular application in patient imaging systems, particularly involving patient imaging devices such as positron emission tomography (PET) scanners and the like. However, it will be appreciated that the described technique may also find application in spectroscopy systems, other nuclear imaging scenarios, other imaging techniques, and the like.

There is a trend in PET imaging to combine a computed tomography (CT) or a magnetic resonance (MR) scanner with a PET scanner. However, such systems are subject to image-truncation problems. For instance, MR and CT images have good quality only within a limited and pre-defined transverse field-of-view (FOV). When scanning a patient or volume of interest (VOI) larger than the CT or MR FOV, the CT or MR image is truncated. The portion of the CT or MR image beyond the CT or MR FOV is badly artifacted, and the portion inside the FOV is moderately artifacted. When one uses the truncated CT or MR image to derive the attenuation map for PET reconstruction, the PET image will be inaccurate and/or artifacts may occur.

Moreover, MR is only sensitive to protons in material, and thus there is no direct relationship between the MR image values and linear attenuation co-efficiencies. When trying to derive an attenuation map for PET reconstruction using an MR image, a derived body contour may be smaller than the actual one.

Conventional multimodal MR/PET and CT/PET systems acquire the MR or CT data, then acquire PET data, and use the MR or CT data to generate an attenuation map used to compensate for attenuation in the PET data set. However, the CT or MR data is truncated when the subject is larger than a certain size, and does not fit into the FOV of the imaging device. If the CT or MR FOV is increased to accommodate the larger subject, CT or MR reconstruction lags and artifacts occur. Moreover, increasing CT or MR FOV is expensive. Additionally, truncated CT or MR data results in an incomplete attenuation map, which in turn degrades the quality of the PET image for which the incomplete attenuation map is employed during reconstruction of acquired PET data.

The present application provides new and improved systems and methods for attenuation correction in multi-modal imaging systems, whereby missing image information is compensated for in an anatomical image, and the corrected anatomical image is employed to generate an artifact-free attenuation map for correcting the PET image, which overcome the above-referenced problems and others.

In accordance with one aspect, an anatomical imaging system includes a memory that stores truncated anatomical image acquired during a scan of a subject and positron emission tomography (PET) data acquired during a PET scan of the subject. The system further includes a processor that reconstructs a non-attenuation-corrected (NAC) PET image from the acquired PET data, generates an attenuation map from the acquired truncated anatomical image, and compensates for truncated data in the attenuation map using a contour in the NAC PET image.

In accordance with another aspect, a method of correcting an attenuation map using a non-attenuation-corrected (NAC) positron emission tomography (PET) image includes generating the NAC PET image, segmenting the NAC PET image to identify a body contour, and identifying a truncated region in the attenuation map. The method further includes correcting truncated image in the truncated region of the attenuation map using the identified contour to infer an appropriate tissue type to use for truncated image, and reconstructing an attenuation-corrected PET image using the corrected attenuation map.

In accordance with another aspect, a method of correcting a computed tomography (CT) image includes generating a non-attenuation-corrected (NAC) positron emission tomography (PET) image, segmenting the NAC PET image to identify a body contour, and identifying a truncated or attenuated region in the CT image. The method further includes inferring a tissue type consistent with the region of truncated or attenuated region of the CT image using the body contour as a guide, projecting CT image data consistent with the inferred tissue type onto the truncated or attenuated region of the CT image to generate a corrected CT image data set, and backprojecting the corrected CT image data set to correct the CT image.

One advantage is that CT or MR field of view is not enlarged.

Another advantage resides in using the high-quality volume boundary provided by a non-attenuated corrected (NAC) PET image of a volume of interest.

Still further advantages of the subject innovation will be appreciated by those of ordinary skill in the art upon reading and understanding the following detailed description.

The innovation may take form in various components and arrangements of components, and in various steps and arrangements of steps. The drawings are only for purposes of illustrating various aspects and are not to be construed as limiting the invention.

Figure 1:
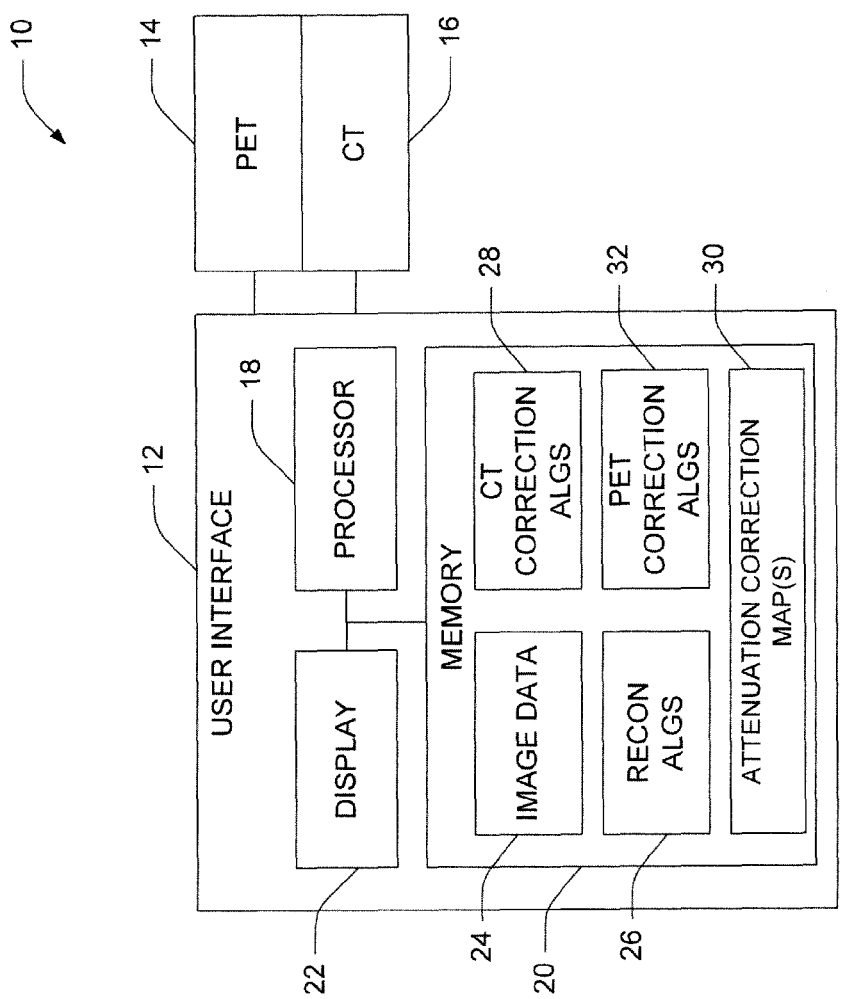
FIG. 1 illustrates a system that uses a non-attenuation corrected PET image to determine a perimeter or outside boundary of a subject or volume of interest.

FIG. 1 illustrates a system 10 that uses a non-attenuation corrected (NAC) PET image to determine a perimeter or outside boundary of a subject or volume of interest (VOI). When a PET scan is reconstructed without attenuation correction, the resultant image is dark near the center and progressively brighter toward the edges. This enables the PET scan to be used to delineate the periphery of the subject or VOI. Once the periphery is determined, it can be used in various ways. First, it may be used to replace the badly artifacted CT or MR image data between the field of view (FOV) and the patient periphery with nominal soft tissue, and the compensated CT or MR image is then used for attenuation correction in the PET scan. Although CT images are presented by way of example in this section, MR, SPECT-CT, projection x-ray, and the like are also contemplated. Alternately, once the periphery of the subject or VOI is known, this information can be used to reduce artifacting in the truncated CT or MR image. For example, the CT or MR image with the substituted soft tissue can be projected into projection data and re-backprojected. As another example, the portion of the subject outside the FOV can be assigned the attenuation properties of nominal soft tissue and the CT data can be adjusted ray by ray for the attenuation of the nominal soft tissue.

The system 10 comprises a user interface 12 (e.g., a workstation or the like) that is coupled to each of a PET scanner 14 and a CT device 16. The user interface 12 comprises a processor 18, which is coupled to a memory 20, both of which are further coupled to a display 22. The memory 20 stores, and the processor generates, analyzes, and/or executes, image data 24 from the PET scanner 14 and/or the CT device 16, reconstruction algorithms 26 for reconstructing PET and/or CT image representations from acquired scan data, CT correction algorithms 28 for correcting CT data and/or images, attenuation correction map(s) 30 generated from CT data to compensate for attenuated PET data, PET correction algorithms 32 for correcting PET data and/or images, etc.

In one embodiment, the processor 18 generates a truncated (e.g., uncorrected, or raw) attenuation map from acquired CT data. Truncated portions of the attenuation map are identified using prior knowledge, such as by comparing acquired CT data to expected values, previously acquired CT data for the subject, or a generic atlas of anatomical structures generated from a plurality of reference subjects. The processor also executes a PET reconstruction algorithm to reconstruct a NAC PET image from acquired PET data, and the NAC image is segmented to identify a contour of an anatomical structure, a tumor, or other structure in the subject, that corresponds to a truncated portion of the attenuation map. The processor executes one or more CT correction algorithms 28 to "fill in" portions of the CT attenuation map outside the FOV using the contour identified from the NAC PET image. For instance, if the attenuation map is truncated near an upper surface of a subject's liver, then the NAC PET image is segmented to identify a contour that delineates the upper surface of the subject's liver. The processor analyzes the contour and makes inferences regarding tissue type along or near the contour. Based on such inferences, the processor fills in truncated portions of the attenuation map with appropriate material, such as soft tissue, hepatic tissue, or some other tissue having a similar density to the tissue type inferred for the truncated portion of the attenuation map. The processor then executes the PET correction algorithm(s) 32 to reconstruct an attenuation-corrected PET image representation that is free of artifacts.

According to another example, the FOV of the CT device 16 is approximately 60 cm. If a subject is larger than 60 cm in diameter or positioned with a portion of the subject outside the 60 cm FOV, the CT data will be truncated. Reconstructing the PET image without correcting for attenuation provides an image that is bright at the surface and dimmer toward the center. Thus, a high-quality contour showing the surface of the subject can be generated in the NAC PET image. Once the surface is delineated, truncation in the CT image can be corrected. For instance, soft tissue CT data can be interpolated into truncated portions of an MR attenuation map, since soft tissue is likely to be found near the surface (e.g., skin) of the subject.

The system can be employed in PET/CT imaging scenarios where a portion of an object or structure close to the body contour is not visible in CT image. Alternatively, the system can be employed in PET/CT imaging scenarios where two modalities are performed sequentially (e.g., not simultaneously), and thus the contour derived from the PET scan can be compared to the CT image to infer potential subject motion between the PET and CT scans. Additionally, the system can be employed in PET imaging scenarios where the contour derived from the NAC PET image is used as emission boundary for scatter correction using single-scatter simulation, in which a tail-fitting procedure utilizes an emission boundary to define pure-scatter tails (e.g., in the absence of true coincidence events).

Figure 2:
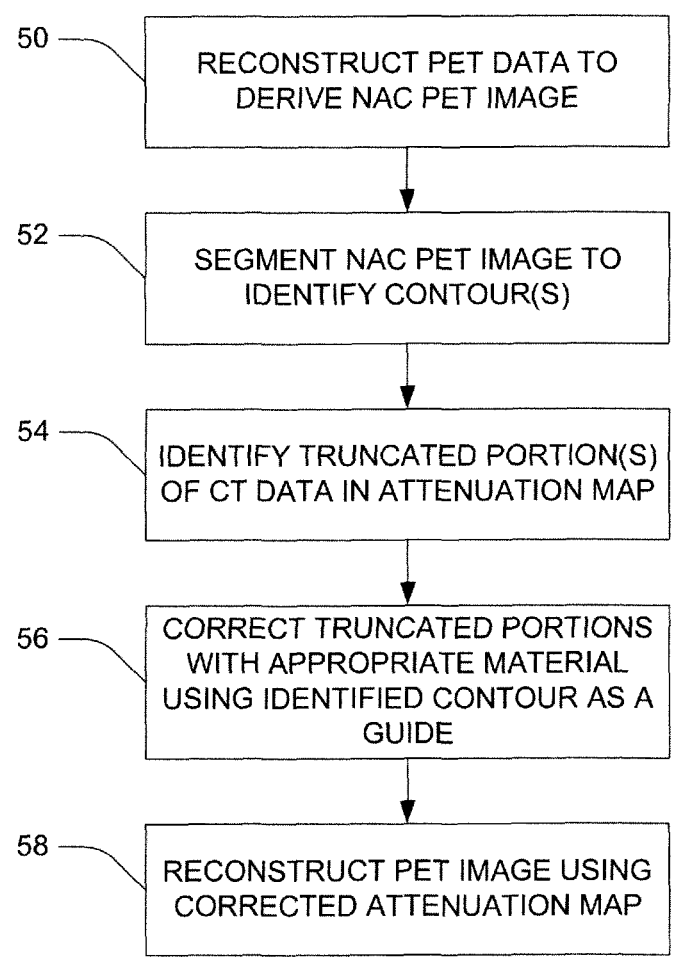
FIG. 2 illustrates a method related to employing a NAC PET image to correct truncated attenuation maps, in accordance with various features.

FIG. 2 illustrates a method related to employing a NAC PET image to correct truncated attenuation maps, in accordance with various features. While the methods are described as a series of acts, it will be appreciated that not all acts may be required to achieve the described goals and/or outcomes, and that some acts may, in accordance with certain aspects, be performed in an order different than the specific orders described.

At 50, acquired PET data is reconstructed, without attenuation correction, to generate the NAC PET image. The NAC PET image is segmented, at 52, to identify one or more contours of a volume of interest (e.g., a tumor or anatomical structure, etc.) in a subject. At 54, an attenuation map generated from acquired CT or MR data is analyzed to identify truncated portions of CT or MR data, such as may occur due to attenuation, small CT or MR field of view, etc. At 56, identified truncated portions of CT or MR data are compensated for (e.g., filled in) using a contour corresponding to the anatomical location or position of the truncated CT or MR data as a guide. For instance, since the contour delineates a surface or boundary of the volume of interest, inferences can be made regarding the type and/or characteristics of tissue near the contour, and replacement CT or MR data can be interpolated as a function of such inferences to fill in truncated areas of the CT or MR attenuation map. At 58, an attenuation-corrected PET image is reconstructed using the corrected MR attenuation map.

In one embodiment, truncated portions of the attenuation map are identified using known data acquisition algorithms that identify accuracy probabilities for data as it is acquired. The probability of accuracy of acquired data is evaluated at 54, and data with a likelihood of accuracy below a predetermined threshold is identified as truncated data. The truncated data is then replaced with interpolated or replacement CT data at 56.

According to an example, data points in the acquired CT data set can be compared to neighboring data points to determine whether their respective values are consistent with the neighboring data points. If a given region has a large number of data points that do not correspond to expected values, then the probability that the data points in the given region are accurate is low. If the probability is below a predetermined threshold level, then the region can be identified as a truncated region, and earmarked for correction or compensation. For instance, a segmented body contour that corresponds to the anatomical location of the truncated CT data region can be generated from the NAC PET image and used as a guide in identifying a body tissue type that is employed when filling in the truncated portion of the CT data.

In one embodiment for correcting the truncated CT image, the FOV of CT image is expanded, e.g., into a circle of a larger diameter. The shape of the truncated tissue determined from the NAC PET image. The truncated shape is filled with the attenuation values for appropriate tissue. In one example, the shape is filled with the attenuation value of nominal tissue. In another example in which the patient is off center to one side, the truncated shape can be filled with a mirror image of the attenuation value from the other side of the patient. In another example, a look up table or memory stores untruncated nominal attenuation images of patients. The corresponding image (slice) to the image (slice) being corrected is retrieved, scaled in accordance with the patient outline from the NAC PET image, and the corresponding portion of the scaled nominal image is used to fill the truncated shape.

The truncated region filled image is forward projected back into projection data which is backprojected to generate a corrected image. If the corrected image is still artifacted, the truncated shape can be refilled with the same correction attenuation values from the table, of nominal tissue, etc. and the forward projection and backprojection process repeated.

In another embodiment, the truncated shape is filled with the correction attenuation values and the contribution of the truncated shape to each ray of the original projection data. For example, after the truncated shape is filled with the correction attenuation values, the rest of the CT image is zeroed. The truncated shape is forward projected to generate correction CT projection data corresponding to the original projection data. Each connection projection is used to adjust the corresponding original projection, e.g., subtracted from it, to create corrected projection data which is backprojected to generate the corrected attenuation map. Optionally, the truncated shape with the synthesized attenuation values can be merged with the corrected attenuation map.

Figure 3:
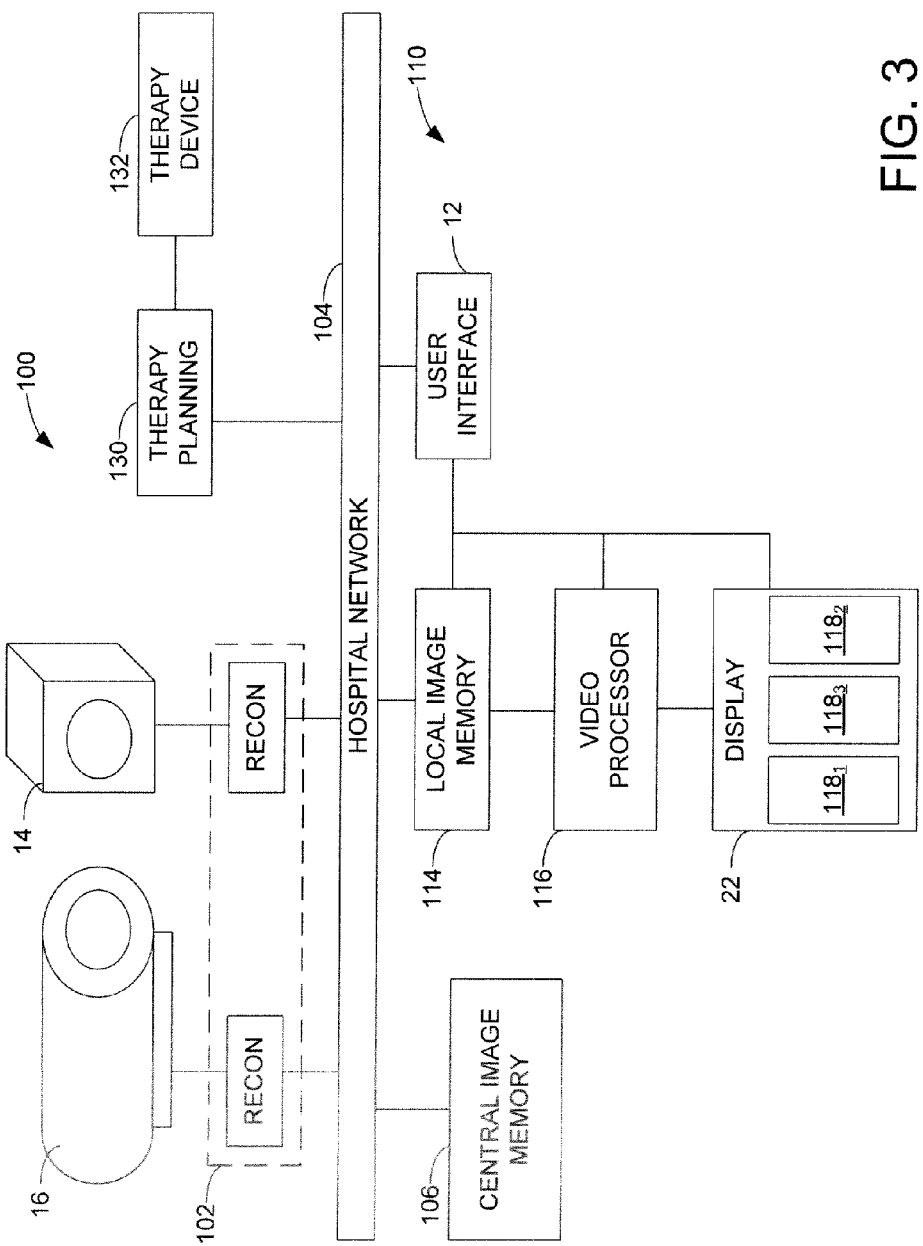
FIG. 3 illustrates an exemplary hospital system with a plurality of imaging devices, such as PET, CT, MRI, or the like, which generate imaging data that are reconstructed by individual or shared reconstruction processors to generate 3D image representations.

With reference to FIG. 3, an exemplary hospital system may include a plurality of imaging devices 100, such as PET 14, CT 16 (or MR), or the like, which generate imaging data that are reconstructed by individual or shared reconstruction processors 102 to generate 3D image representations. The image representations are communicated over a network 104 to a central memory 106 or a local memory 108.

At a station 110 connected with the network, an operator uses user interface 12 to move a selected 3D patient CT or MR attenuation map to or between the central memory 106 and the local memory 108. A video processor 116 displays the selected attenuation map in a first viewport 118$_1$, of the display 20. The NAC PET image is displayed in a second viewport 118$_2$. A third view port 118$_3$ can display an overlay of the attenuation map and the NAC PET image. For example, a user can be permitted to register landmarks in the PET and MR or CT attenuation map to corresponding structures or landmarks in the NAC PET image. For instance, the operator, through the interface 12, selects the NAC PET image landmarks (e.g., using a mouse, stylus, or other suitable user input device) that correspond to landmarks in the attenuation map image. Alternately, the NAC PET attenuation map can be aligned automatically by a program in the processor 116. The processor 18 (FIG. 1) in the user interface 12 then performs correction algorithms and infers an appropriate tissue type to employ when filling in truncated areas in the attenuation map.

The corrected attenuation map can then be used to reconstruct an artifact-free attenuation-corrected PET image, which may be used in other applications. For instance, a therapy planning station 130 can use the attenuation-corrected PET image to plan a therapy session. Once planned to the satisfaction of the operator, the planned therapy can, where appropriate to an automated procedure, be transferred to a therapy device 132 that implements the planned session. Other stations may use the attenuation-corrected PET image in various other planning processes.

In another embodiment, the overlay displayed in viewport 118$_3$ is adjustable to weight the CT or MR image data relative to the PET image, or vice versa. For instance a slider bar or knob (not shown), which may be mechanical or presented on the display 20 and manipulated with an input device, may be adjusted to vary the weight of the image or the PET image. In one example, an operator can adjust the image in viewport 118$_3$ from purely CT or MR image data (as is shown in viewport 118$_1$), through multiple and/or continuous combinations of CT/MR and PET image data, to purely PET image data (as is shown in viewport 118$_2$). For instance, a ratio of CT or MR image data to PET image data can be discretely or continuously adjusted from 0:1 to 1:0. As another option, the CT or MR image can be displayed in grayscale and the PET image can be colorized. Anatomical landmarks in the CT or MR image help relate the PET image to the subject.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. An anatomical image correction system, including:
   a memory that stores truncated anatomical image data acquired during a scan of a subject and positron emission tomography (PET) data acquired during a PET scan of the subject; and
   a processor that reconstructs a non-attenuation-corrected (NAC) PET image from the acquired PET data, generates an attenuation map from the acquired truncated anatomical image data, and compensates for truncated image data in the attenuation map using a contour in the NAC PET image;
   wherein the processor identifies a contour in the NAC PET image that corresponds to a truncated region of the attenuation map, and infers a tissue type for use in correcting the truncated region of the attenuation map as a function of the identified contour.

2. The system according to claim 1, wherein the processor determines a likelihood of accuracy of data in the attenuation map.

3. The system according to claim 2, wherein the processor identifies a truncated region of the attenuation map by determining whether truncated data in the region has a likelihood of accuracy below a predetermined threshold.

4. The system according to claim 1, wherein the processor fills the truncated region with interpolated data consistent with the inferred tissue type to correct the truncated region.

5. The system according to claim 4, wherein the processor employs the corrected attenuation map to reconstruct an attenuation-corrected PET image from the PET data.

6. The system according to claim 1, further including an imaging device that acquires the truncated anatomical image, and a PET scanner that acquires the PET data.

7. The system according to claim 1, further including a display that presents the NAC PET image, the attenuation map, and an overlay of the NAC PET image and the attenuation map, to a user.

8. The system according to claim 1, wherein the processor is further configured to:
   reconstruct the NAC PET image and the attenuation map;
   correct truncated data in the attenuation map using the contour in the NAC PET image; and
   correct attenuated PET data using the corrected attenuation map.

9. The system according to claim 1, wherein the memory stores and the processor executes machine executable instructions, including:
   a routine for generating the NAC PET image;
   a routine for segmenting the NAC PET image to identify the contour;
   a routine for identifying a truncated region in the attenuation map;

a routine for correcting the truncated region using the identified contour as a guide; and a routine for reconstructing an attenuation-corrected PET image using the corrected attenuation map.

10. A method of correcting an attenuation map using a non-attenuation-corrected (NAC) positron emission tomography (PET) image, including:

generating the NAC PET image;

segmenting the NAC PET image to identify a body contour;

identifying a truncated region in the attenuation map;

correcting the truncated region of the attenuation map using the identified contour to infer an appropriate tissue type to use for truncation compensation; and reconstructing an attenuation-corrected PET image using the corrected attenuation map.

11. The method according to claim 10, further including sequentially performing a scan to acquire the truncated anatomical image data used to generate the attenuation map and a PET scan to acquire PET data used to generate the NAC PET image and the attenuation corrected PET image.

12. The method according to claim 11, further including using the acquired truncated image data and the body contour derived from the acquired PET data to identify patient motion between the truncated scan and the PET scan.

13. The method according to claim 10, further including displaying the attenuation map, the NAC PET image, and an overlay of the NAC PET image and the attenuation map, to a user.

14. The method according to claim 10, further including determining a likelihood of accuracy of data in the attenuation map.

15. The method according to claim 14, further including identifying the truncated region of the attenuation map by determining whether truncated data in the region has a likelihood of accuracy below a predetermined threshold.

16. The method according to claim 10, further including identifying a plurality of body contours and selecting a body contour corresponding to the truncated region for use in correcting the truncated data in the attenuation map after identifying the truncated region.

17. An anatomical image system including a processor programmed to perform the method according to claim 10.

18. The method according to claim 10, performed by software for controlling one or more computers, the software being stored on a non-transitory computer-readable medium.

19. The method according to claim 10, further including employing the body contour as an emission boundary, executing a single-scatter simulation procedure for scatter correction, and executing a tail-fitting procedure to define and correct pure-scatter tails when reconstructing the attenuation-corrected PET image.

20. A method of correcting a computed tomography (CT) image, including:

generating a non-attenuation-corrected (NAC) positron emission tomography (PET) image;

segmenting the NAC PET image to identify a body contour;

identifying a truncated or attenuated region in the CT image;

inferring a tissue type consistent with the region of truncated or attenuated region of the CT image using the body contour as a guide;

projecting CT image data consistent with the inferred tissue type onto the truncated or attenuated region of the CT image to generate a corrected CT image data set; and backprojecting the corrected CT image data set to correct the CT image.

* * * * *